(12) United States Patent
Tachiyama

(10) Patent No.: US 7,177,044 B2
(45) Date of Patent: Feb. 13, 2007

(54) DATA TRANSFER METHOD

(75) Inventor: Osamu Tachiyama, Tachikawa (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1003 days.

(21) Appl. No.: 10/047,035

(22) Filed: Jan. 17, 2002

(65) Prior Publication Data

US 2003/0133148 A1 Jul. 17, 2003

(51) Int. Cl.
*G06F 3/12* (2006.01)
(52) U.S. Cl. .................. 358/1.15; 358/1.15; 358/1.18; 715/151
(58) Field of Classification Search ............... 358/1.15, 358/1.18; 715/151
See application file for complete search history.

(56) References Cited

U.S. PATENT DOCUMENTS

| 6,925,631 | B2 * | 8/2005 | Golden ...................... 717/115 |
| 7,042,593 | B2 * | 5/2006 | Matsushima ................. 358/1.9 |
| 2001/0037460 | A1 * | 11/2001 | Porcari ....................... 713/201 |
| 2002/0040431 | A1 * | 4/2002 | Kato et al. .................. 713/168 |
| 2002/0178353 | A1 * | 11/2002 | Graham ....................... 713/151 |
| 2003/0072027 | A1 * | 4/2003 | Haines et al. .............. 358/1.15 |
| 2003/0101184 | A1 * | 5/2003 | Chiu et al. .................... 707/10 |
| 2003/0117664 | A1 * | 6/2003 | McCarthy .................... 358/402 |

FOREIGN PATENT DOCUMENTS

JP  8-297616  12/1996

* cited by examiner

*Primary Examiner*—David Moore
*Assistant Examiner*—Michael Burleson
(74) *Attorney, Agent, or Firm*—Foley & Lardner LLP

(57) ABSTRACT

When data transmission/reception is performed between a center and a target machine, commands and parameters are described in a predetermined format permitting transmission/reception by e-mail. The data transmission/reception is executed using an e-mail function.

11 Claims, 6 Drawing Sheets

DATA TRANSFER METHOD

BACKGROUND OF THE INVENTION

The present invention relates to a data transfer method for executing data read/write in a system wherein a center and a target machine are connected by a network.

In the prior art, a center and an individual target machine are connected in a point-to-point fashion using a telephone line, and communication is effected therebetween to execute data write/read.

However, even if there is information to be sent from the target machine, the center has a main right of control, and immediate communication is not effected. The information can first be sent after line connection is established from the center.

In the prior-art method as described above, data read/write is performed using the telephone line, and thus the communication speed varies depending on a modem. For instance, the communication speed is between ten-odd KBPS and several-ten KBPS and is slow. Thus, a considerable length of time is consumed.

Since the communication speed is slow, the call time increases, and a high cost is incurred due to the use of the telephone line.

Moreover, since the telephone line is an analog line, the probability of communication error is high. There may be a problem that the communication is interrupted, and thus communication has to be established once again, or a still longer time is needed owing to an erroneous procedure.

Besides, since the center has a main right of access, information from the target machine is not immediately told to the center, and real-time operations cannot be performed.

In order to solve the problem, there is an idea that a dial call is made from the target machine. In this case, however, since the user's line is used without permission, a communication cost occurs on the user side. In addition, a call cannot be made in the case of a dedicated receiving line.

There is another idea of using the Internet for the network. However, in most cases, an Intranet in a company is provided with a firewall for preventing access from the outside, and an external data access is substantially prohibited.

BRIEF SUMMARY OF THE INVENTION

The object of the present invention is to provide a data transfer method capable of executing data read/write in a target machine in a system wherein a center and the target machine are connected by a network.

In order to achieve the object, there is provided a data transfer method for executing data read/write between a center machine and a target machine which are connected via a communication line, the center machine preparing an e-mail in a predetermined format for read-out of data stored in the target machine, and sending the prepared e-mail of the predetermined format to the target machine via the communication line, the target machine analyzing the e-mail of the predetermined format received via the communication line, reading out the data stored in the target machine on the basis of an analysis result, preparing an e-mail of a predetermined format, which contains the read-out data, and sending the prepared e-mail of the predetermined format to the center machine via the communication line, and the center machine analyzing the e-mail of the predetermined format received from the target machine via the communication line, and obtaining data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
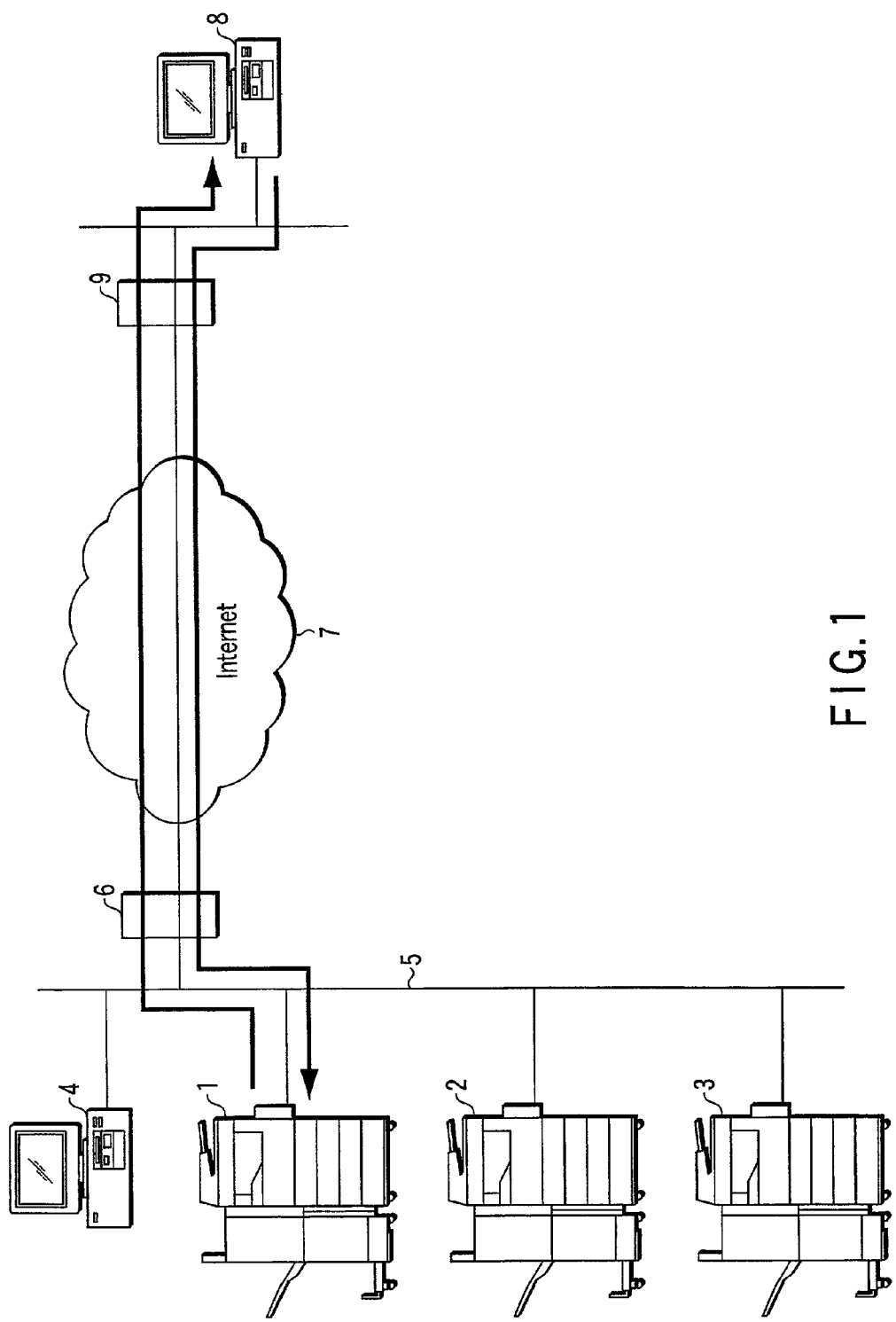
FIG. 1 is a block diagram showing a schematic structure of a system according to a data transfer method of the present invention.

FIG. 1 shows a schematic structure of a system according to a data transfer method of the present invention. This system includes digital multi-functional peripherals MFP1, MFP2 and MFP3 serving as image forming apparatuses, and a personal computer 4, which are connected to an Intranet 5 serving as an intra-company network. The Intranet 5 is provided with a firewall 6 and is connected to the Internet 7. A center machine 8 is connected to the Internet 7 via a firewall 9. The center machine 8 executes data read/write for the MFP1, MFP2 and MFP3.

As will be described later in detail, the center side is the center machine 8, and the target machine side is the MFP1, MFP2 or MFP3.

The MFP (1, 2, 3) has multiple functions such as a copying function, a printing function, a scanner function, a facsimile function, and an Internet function.

Figure 2:
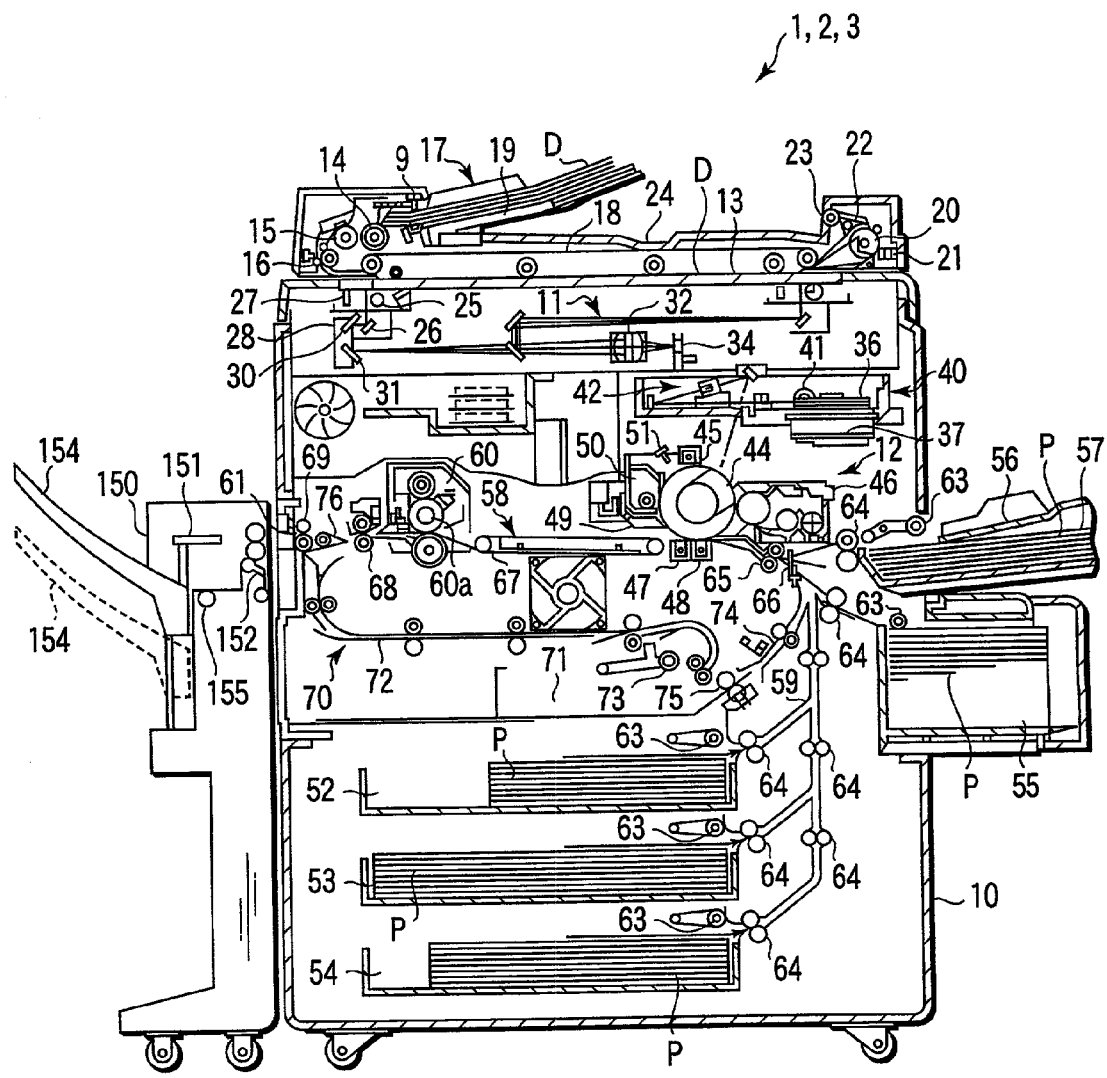
FIG. 2 is a cross-sectional view showing an internal structure of an MFP.

FIG. 2 is a cross-sectional view showing an internal structure of the MFP (1, 2, 3) shown in FIG. 1.

In FIG. 2, the MFP (1, 2, 3) has an apparatus main body 10. The apparatus main body 10 incorporates a scanner section 11 functioning as an image read section and a printer section 12 functioning as an image forming section.

An original table 13 formed of transparent glass, on which a read object, i.e. an original D is placed, is disposed on the upper surface of the apparatus main body 10. An automatic document feeder 17 (hereinafter referred to as "ADF") for automatically feeding originals D onto the original table 13 is disposed on the upper surface of the apparatus main body 10. The ADF 17 is disposed to be opened/closed with respect to the original table 13 and serves as an original cover for bringing the original D placed on the original table 13 into close contact with the original table 13.

The ADF 17 has an original tray 19 on which the original D is set; pickup rollers 14 for picking up originals on the original tray 19 one by one; a feed roller 15 for conveying the picked-up original; an aligning roller pair 16 for aligning the leading edges of the originals; and a conveyor belt 18 disposed to cover almost the entire surface of the original table 13. A plurality of originals set on the original tray 19 with their surfaces facing up are sequentially taken out from the lowermost page, i.e. the last page, aligned by the aligning roller pair 16, and conveyed to a predetermined position on the original table 13 by the conveyor belt 18.

In the ADF 17, a reversing roller 20, a non-reverse sensor 21, a flapper 22 and a delivery roller 23 are disposed at the end portion on the opposite side of the aligning roller pair 16 with respect to the conveyor belt 18. The original D whose image information has been read by the scanner section 11 (to be described later) is fed from the original table 13 by the conveyor belt 18 and delivered to an original delivery section 24 on the ADF 17 through the reversing roller 20, flapper 21 and delivery roller 22. To read the lower surface of the original D, the flapper 22 is switched. The original D conveyed by the conveyor belt 18 is reversed by the reversing roller 20 and fed to a predetermined position on the original table 13 again by the conveyor belt 18.

The scanner section 11 provided in the apparatus main body 10 has an exposure lamp 25 as a light source for illuminating the original D placed on the original table 13, and a first mirror 26 for deflecting reflection light from the original D in a predetermined direction. The exposure lamp 25 and first mirror 26 L are attached to a first carriage 27 disposed under the original table 13.

The first carriage 27 is disposed to be movable in parallel to the original table 13 and reciprocally moved under the original table 13 by a scanning motor through a toothed belt (not shown), etc.

A second carriage 28 movable in parallel to the original table 13 is disposed under the original table 13. Second and third mirrors 30 and 31 for successively deflecting reflection light from the original D, which has been deflected by the first mirror 26, are attached to the second carriage 28 at right angles with each other. The second carriage 28 is moved by, e.g. the toothed belt for driving the first carriage 27 along with the first carriage 27, and moved in parallel along the original table 13 at half the speed of the first carriage 27.

A focusing lens 32 for focusing reflection light from the third mirror 31 mounted on the second carriage 28, and a CCD (photoelectric conversion element) 34 for receiving the reflected light focused by the focusing lens and photoelectrically converting it are also disposed under the original table 13. The focusing lens 32 is disposed in a plane including the optical axis of the light deflected by the third mirror 31 so as to be movable by means of a driving mechanism. The focusing lens 32 moves to focus the reflection light at a desired magnification. The CCD 34 photoelectrically converts the incoming reflection light and outputs an electrical signal corresponding to the read original D.

On the other hand, the printer section 12 has a laser exposure unit 40 functioning as a latent image forming means. The laser exposure unit 40 comprises a semiconductor laser 41 as a light source; a polygon mirror 36 as a scanning member for continuously deflecting a laser beam emitted by the semiconductor laser 41; a polygon motor 37 as a scanning motor for rotatably driving the polygon mirror 36 at a predetermined rotational speed; and an optical system 42 for deflecting the laser beam from the polygon mirror 36 and guiding the beam to a photosensitive drum 44 (to be described later). The laser exposure unit 40 with the above structure is fixed to a support frame (not shown) of the apparatus main body 10.

The semiconductor laser 41 is ON/OFF-controlled in accordance with the image information of the original D read by the scanner section 11 or facsimile transmission/reception document information. The laser beam is directed to the photosensitive drum 44 through the polygon mirror 36 and optical system 42 to scan the outer surface of the photosensitive drum 44, thereby forming an electrostatic latent image on the outer peripheral surface of the photosensitive drum 44.

The printer section 12 has the rotatable photosensitive drum 44 as an image carrier disposed almost at the center of the apparatus main body 10. The outer peripheral surface of the photosensitive drum 44 is exposed to the laser beam from the laser exposure unit 40, and so a desired electrostatic latent image is formed thereon. Around the photosensitive drum 44, the following elements are arranged in the named order: a charger 45 for electrifying the outer peripheral surface of the drum 44 with a predetermined charge; a developing device 46 for supplying toner as a developer to the electrostatic latent image formed on the outer peripheral surface of the photosensitive drum 44 to develop it at a desired image density; a transfer charger 48, which integrally includes a separation charger 47 for separating an image formation medium, i.e. a paper sheet P, fed from a paper cassette (to be described later) from the photosensitive drum 44, and transfers the toner image formed on the photosensitive drum 44 onto the paper sheet P; a separation gripper 49 for separating the paper sheet P from the outer peripheral surface of the photosensitive drum 44; a cleaning unit 50 for removing toner remaining on the outer peripheral surface of the photosensitive drum 44; and a charge erase device 51 for erasing charge on the outer peripheral surface of the photosensitive drum 44.

An upper sheet cassette 52, a middle sheet cassette 53 and a lower sheet cassette 54 which can be drawn out of the apparatus main body 10 are stacked at the lower portion of the apparatus main body 10. These cassettes 52 to 54 store paper sheets P of different sizes. A large-capacity feeder 55 is disposed on one side of these cassettes. This large-capacity feeder 55 stores about 3,000 paper sheets P having a size with high use frequency, e.g. paper sheets P with A4 size. A feed cassette 57 also serving as a manual feed tray 56 is detachably attached above the large-capacity feeder 55.

A convey path 58 extending from the sheet cassettes and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10, which is opposed to the fixing unit 60. A single-tray finisher 150 is attached to the delivery port 61.

Pickup rollers 63 for taking out the paper sheets P one by one from the sheet cassette 52, 53, 54, 57 or large-capacity feeder 55 are arranged near each of the upper sheet cassette 52, middle sheet cassette 53, lower sheet cassette 54 and feed cassette 57 and near the large-capacity feeder 55. A number of feed roller pairs 64 for conveying the paper sheet P taken out by the pickup rollers 63 through the convey path 58 are arranged in the convey path 58.

A registration roller pair 65 is arranged in the convey path 58 on the upstream side of the photosensitive drum 44. The registration roller pair 65 corrects a tilt of the extracted paper sheet P, registers the leading edge of the toner image on the photosensitive drum 44 and the leading edge of the paper sheet P, and feeds the paper sheet P to the transfer section at the same speed as the speed of movement of the outer peripheral surface of the photosensitive drum 44. A pre-aligning sensor 66 for detecting arrival of the paper sheet P is provided in front of the registration roller pair 65, i.e. on the feed roller 64 side.

Each paper sheet P extracted one by one from the sheet cassette, 52, 53, 54, 57 or large-capacity feeder 55 by the pickup rollers 63 is fed to the registration roller pair 65 by the feed roller pair 64. After the leading edge of the paper sheet P is aligned by the registration roller pair 65, the paper sheet P is fed to the transfer section.

In the transfer section, a developer image, i.e. toner image formed on the photosensitive drum 44 is transferred onto the paper sheet P by the transfer charger 48. The paper sheet P on which the toner image has been transferred is separated from the outer peripheral surface of the photosensitive drum 44 by the function of the separation charger 47 and separation gripper 49 and conveyed to the fixing unit 60 through a conveyor belt 67 constituting part of the convey path 58. After the developer image is melted and fixed on the paper sheet P by the fixing unit 60, the copying paper sheet P is delivered onto the finisher 150 through the delivery port 61 by a feed roller pair 68 and a delivery roller pair 69.

An automatic double-side unit 70 for reversing the paper sheet P which has passed through the fixing unit 60 and feeding it to the registration roller pair 65 again is provided under the convey path 58. The automatic double-side unit 70 comprises a temporary stack 71 for temporarily stacking the paper sheets P; a reversing path 72 branched from the convey path 58 to reverse the paper sheet P which has passed through the fixing unit 60 and to guide the paper sheet P to the temporary stack 71; pickup rollers 73 for extracting the paper sheets P stacked on the temporary stack one by one; and a feed roller 75 for feeding the extracted paper sheet P to the registration roller pair 65 through a convey path 74. A selector gate 76 for selectively distributing the paper sheets P to the delivery port 61 or reversing path 72 is provided at the branch portion between the convey path 58 and reversing path 72.

Where double-copying is performed, the paper sheet P which has passed through the fixing unit 60 is guided to the reversing path 72 by the selector gate 76, temporarily stacked on the temporary stack 71 in a reversed state, and fed to the registration roller pair 65 through the convey path 74 by the pickup rollers 73 and feed roller 75. The paper sheet P is registered by the registration roller pair 65 and fed to the transfer section again to transfer a toner image onto the reverse surface of the paper sheet P. Thereafter, the paper sheet P is delivered to the finisher 150 through the convey path 58, fixing unit 60 and delivery rollers 69.

The finisher 150 staples delivered copies of documents and stores them in units of a copy. Each time a paper sheet P to be stapled has been delivered from the delivery port 61, a guide bar 151 aligns the paper sheet P to the stapling side. When all paper sheets have been delivered, a copy of paper sheets P is pressed by a paper press arm 152 and stapled by a stapler unit (not shown). Then the guide bar 151 moves downward. The stapled paper sheets P are delivered to a finisher delivery tray 154 by a finisher delivery roller 155 in units of a copy. The downward movement amount of the finisher delivery tray 154 is roughly determined in accordance with the number of paper sheets P to be delivered, and the finisher delivery tray 154 moves downward stepwise every time one copy is delivered. The guide bar 151 for aligning the delivered paper sheets P is located at such a high position that the guide bar 151 may not abut upon the already stapled paper sheets P placed on the finisher delivery tray 154.

The finisher delivery tray 154 is connected to a shift mechanism (not shown) which shifts (e.g. in four directions: front, rear, left and right sides) in units of a copy in the sort mode.

An operation panel 80 for inputting various copy conditions, a copy start signal for starting copying operations, etc. is provided at the upper portion on the front side of the apparatus main body 10.

Figure 3:
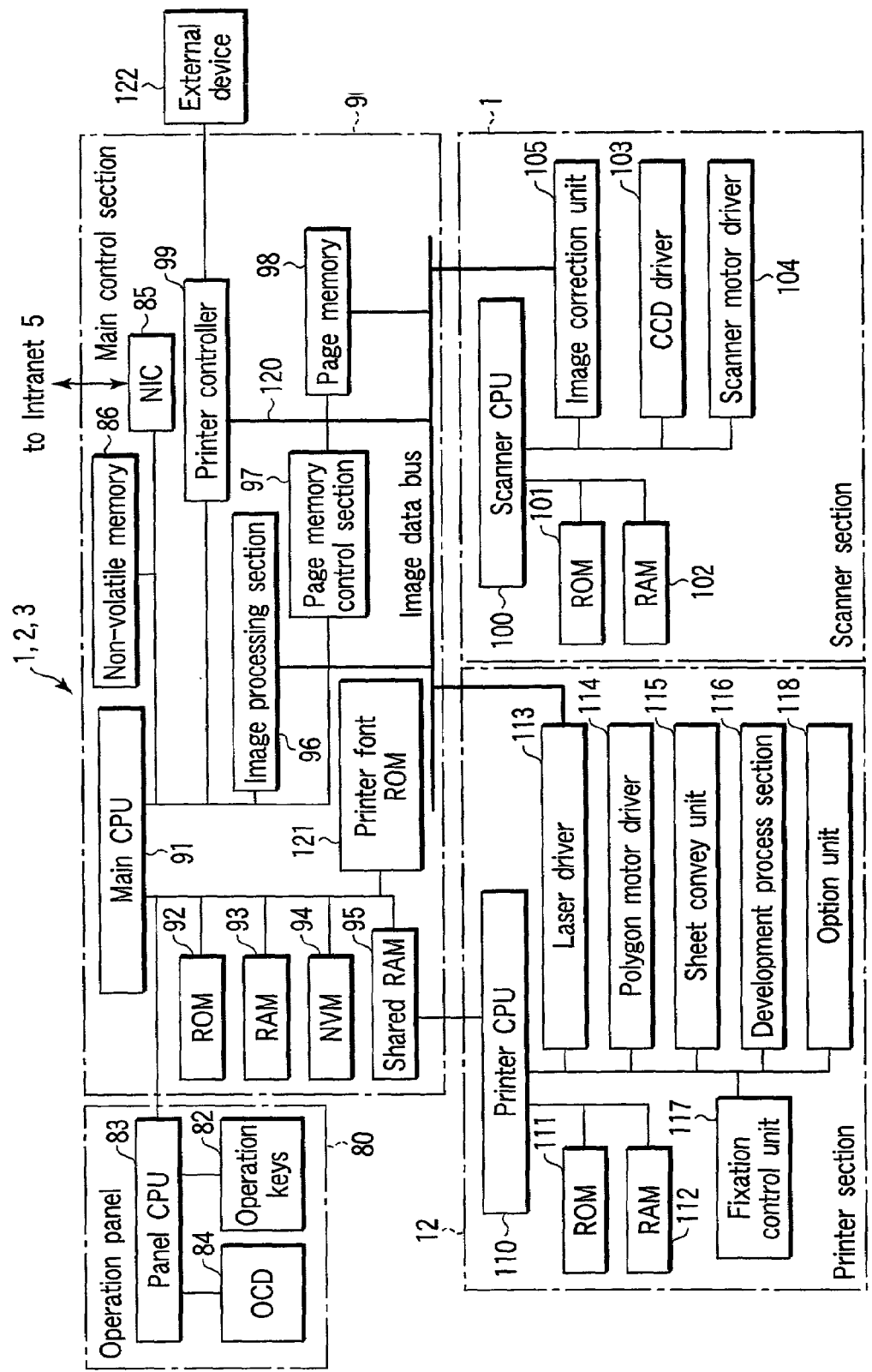
FIG. 3 is a block diagram schematically illustrating electrical connections in the MFP and flows of signals for control.

FIG. 3 is a block diagram schematically showing electrical connection of the MFP (1, 2, 3) shown in FIG. 1 and flow of signals for control. In FIG. 3, in the MFP (1, 2, 3), a control system comprises three CPUs: a main CPU 91 provided in a main control section 90; a scanner CPU 100 in the scanner section 11; and a printer CPU 110 in the printer section 12. The main CPU 91 performs bi-directional communication with the printer CPU 110 via a shared RAM 95. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

The operation panel 80 comprises various operation keys 82, a liquid crystal display section 84, and a panel CPU 83 to which the operation keys 82 and display section 84 are connected. The operation panel 80 is connected to the main CPU 91.

The liquid crystal display section 84 displays the number of originals and the number of copies, and also displays the copying magnification, editing, and various operational guidances. The liquid crystal display section 84 is provided with a touch panel, which enables input of various operational instructions, such as input by selection keys. For example, it displays selection keys for a photo mode, a character mode and a character/photo mode as original modes, and permits input thereof.

The main control section 90 comprises the main CPU 91, a ROM 92, a RAM 93, an NVRAM 94, a shared RAM 95, an image processing section 96, a page memory control unit 97, a page memory 98, a printer controller 99, an NIC (Network Interface Card) 85, a non-volatile memory 86, and a printer font ROM 121.

The main CPU 91 controls the entirety of the main control section 90. The ROM 92 stores control programs, etc. The RAM 93 temporarily stores various data. In particular, the ROM 92 stores control programs for reading an image of a paper sheet and detecting the size of the paper sheet on the basis of the read image.

The NVM (Non-Volatile RAM) 94 is a non-volatile memory backed up by a battery (not shown). Even when power is not supplied to the NVM 94, stored data is maintained.

The shared RAM 95 is used to perform bidirectional communication between the main CPU 91 and printer CPU 110.

The page memory controller 97 stores and reads out image information in and from the page memory 98. The page memory 98 has areas capable of storing image information of a plurality of pages. The page memory 98 can store compressed data in units of a page, which is obtained by compressing image information from the scanner section 11.

The NIC 85 is an interface for connecting the MFP (1, 2, 3) to the network.

The non-volatile memory 86 is, e.g. a hard disc drive for storing data.

The printer font ROM 121 stores font data corresponding to print data.

The printer controller 99 develops print data, which is sent from an external device 122 such as a personal computer, into image data using the font data stored in the printer font ROM 121 with a resolution corresponding to resolution data added to the print data.

The scanner section 11 comprises the scanner CPU 100 for controlling the entirety of the scanner section 11; a ROM 101 storing control programs, etc.; a data storage RAM 102; a CCD driver 103 for driving the CCD sensor 34; a scan motor driver 104 for controlling the rotation of a scan motor for moving the exposure lamp 25, mirrors 26, 27 and 28, etc.; and an image correction unit 105. The image correction section 105 comprises an A/D converter for converting analog signals output from the CCD sensor 34 to digital signals; a shading correction circuit for correcting a variance in the CCD sensor 34, or a variation in threshold level due to ambient temperature variation relative to the output signal from the CCD sensor 34; and a line memory for temporarily storing shading-corrected digital signals from the shading correction circuit.

The printer section 12 comprises the printer CPU 110 for controlling the entirety of the printer section 12; a ROM 111 storing control programs, etc.; a data storage RAM 112; a laser driver 113 for driving the semiconductor laser 41; a polygon motor driver 114 for controlling the rotation of the polygon motor 37 of the laser exposure unit 40; a sheet convey unit 115 for controlling conveyance of the sheet P by the convey mechanism 58; a process control section 116 for controlling charging, developing and transferring processes using the charging device 45, developing device 46 and transfer charger 48; a fixation control unit 117 for controlling the fixing device 60; and an option unit 118.

The image processing section 96, page memory 98, printer controller 99, image correction section 105, and laser driver 113 are connected over an image data bus 120.

Figure 4:
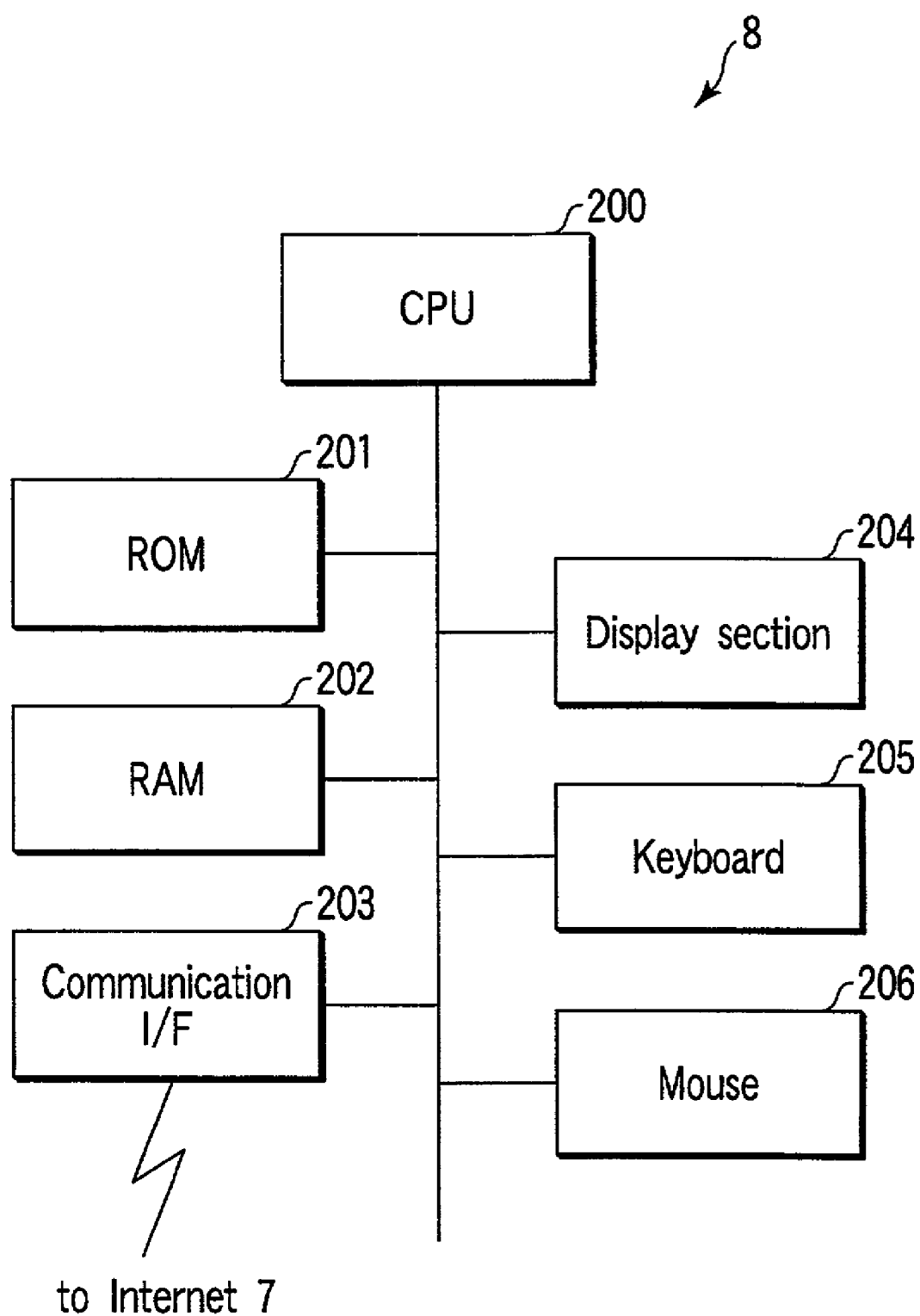
FIG. 4 is a block diagram showing an example of the structure of a center machine.

FIG. 4 shows an example of the structure of the center machine 8. The center machine 8 comprises a CPU 200 for controlling the entirety; a ROM 201 storing analysis software, control programs, etc.; a RAM 202 for temporarily storing data; a communication interface (I/F) 203 for communication with the Internet 7; a display section 204 for displaying various information; and a keyboard 205 and a mouse 206 as input means.

The data transfer method of the present invention with the above-described structure will now be described.

In the present invention, the data transmission/reception can be performed between the center and the target machine in the following three modes.
(1) When the state of the target machine is to be monitored, the center sends a state inquiry to the target machine and recognizes the state.
(2) When data in the target machine is to be changed, the center sends a command to the target machine and the target machine executes a data change.
(3) The target machine performs information notification to the center.

In the present invention, when the data transmission/reception is performed, commands and parameters are described in a predetermined format permitting transmission/reception by e-mail. The data transmission/reception is executed by an e-mail function (hereinafter referred to as "mail") using the Internet.

In connection with mode (1), when data is to be read out from the target machine, the center describes read-out commands and parameters representing necessary data according to a predetermined format, and sends the data to the target machine by mail.

The target machine analyzes the received mail. If the analysis result indicates the read-out command, it further analyzes which data is associated with the read-out command, and reads out data as an analysis result. The target machine describes the read-out data by reassembling it according to a predetermined format, and sends the reassembled data to the center in the form of a mail.

In connection with mode (2), when data is to be written in the target machine, the same operations as in the data read-out are basically performed. Only the direction of data flow is reversed.

To begin with, the center describes write data according to a predetermined format, and sends it to the target machine by mail.

The target machine analyzes the received mail, and writes designated data in a requested area based on the analysis result.

Then, the target machine returns an ACK mail to the effect that data write has normally been completed. Thereby, the center can surely confirm the data write.

In connection with mode (3), if any trouble occurs in the target machine and this state has to be reported to the center, the target machine describes the content of the report according to a predetermined format and informs the center of the state by mail.

The center receives the mail and executes an actual service process.

Figure 5:
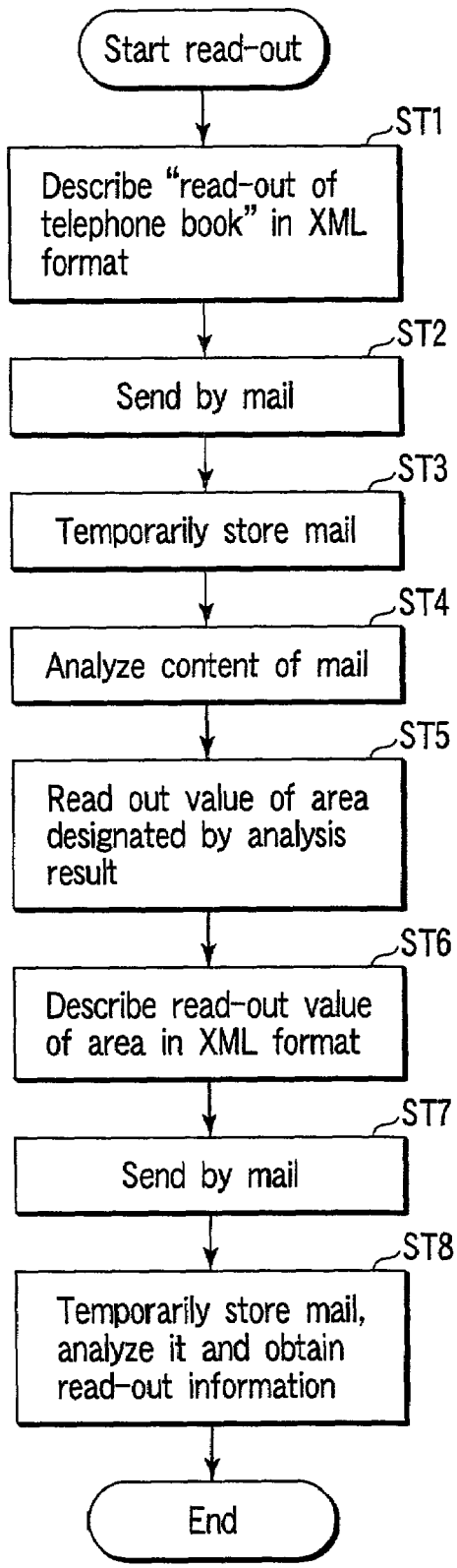
FIG. 5 is a flow chart illustrating a read-out operation.

The read-out operation in the system shown in FIG. 1 will now be described with reference to a flow chart of FIG. 5. Assume that the target machine is the MFP 1 and a telephone book is to be read out.

The CPU 200 of center machine 8 describes "read-out of telephone book" in an XML (extensible markup language) format as follows (ST1):

<RPhoneBook1>
</RPhoneBook1>

The CPU 200 of center machine 8 sends this as mail content to the MFP1 via the communication I/F 203 and Internet 7 (ST2). Since this content is sent in the form of a mail, it can pass through the firewalls 6 and 9.

The main CPU 91 of MFP1 temporarily stores the mail received from the Internet 7 via the NIC 85 in the RAM 93 (ST3). The main CPU 91 of MFP1 analyzes the content in the RAM 93 using analysis software prestored in the ROM 92 (ST4) and obtains an analysis result of "read-out of designated area" (ST5).

The CPU 91 of MFP1 reads out the value of the designated area in the non-volatile memory 86 and describes as follows in XML format (ST6):

<PhoneBook1>
<Name> TOSABA </Name>
<Number> 0445205824 </Number>
</PhoneBook1>

The main CPU 91 of MFP1 sends this as mail content to the center machine 8 via the NIC 85 and Internet 7 (ST7). Since this content is sent in the form of a mail, it can pass through the firewalls 6 and 9.

The CPU 200 of center machine 8 temporarily stores the mail received from the Internet 7 via the communication I/F 203 in the RAM 202. The CPU 200 analyzes the mail using analysis software prestored in the ROM 201 and obtains an analysis result of "TOSABA, 0445205824" (ST8).

Figure 6:
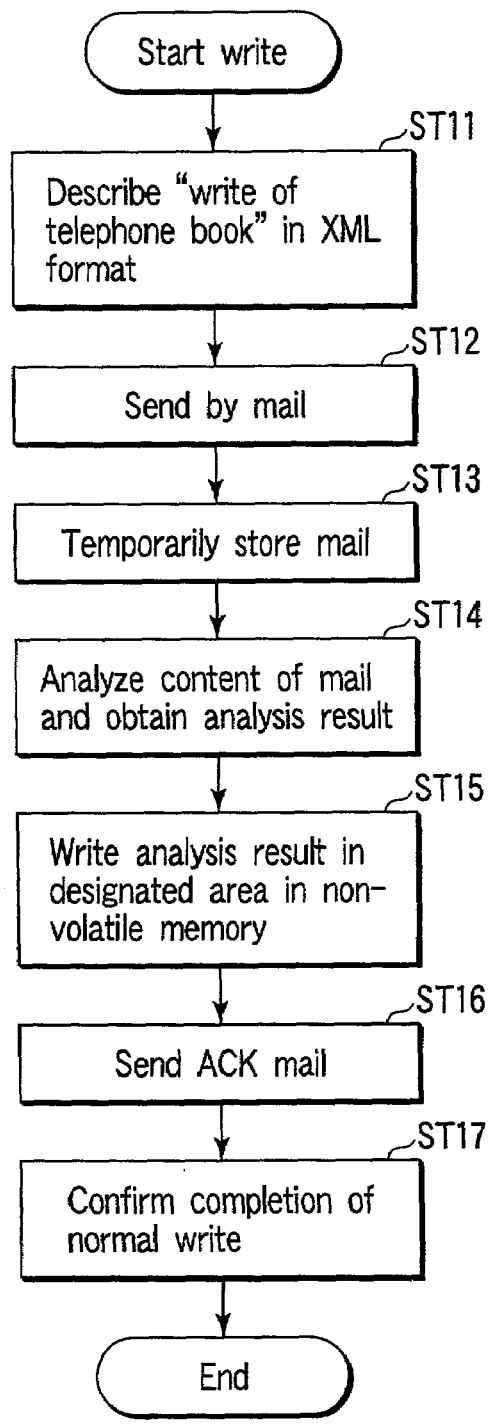
FIG. 6 is a flow chart illustrating a write operation.

The write operation in the image forming system shown in FIG. 1 will now be described with reference to a flow chart of FIG. 6. In this case, the target machine is MFP 1 and the write operation is performed.

The CPU 200 of center machine 8 describes "write of telephone book" in an XML format as follows (ST11):
    <WPhoneBook1>
    <Name> TOSABA </Name>
    <Number> 0445205824 </Number>
    </WPhoneBook1>

The CPU 200 of center machine 8 sends this as mail content to the MFP1 via the communication I/F 203 and Internet 7 (ST12).

The main CPU 91 of MFP1 temporarily stores the mail received from the Internet 7 via the NIC 85 in the RAM 93 (ST13). The main CPU 91 of MFP1 analyzes the content in the RAM 93 using analysis software prestored in the ROM 92 and obtains an analysis result of "write to designated area in telephone book " (ST14).

The CPU 91 of MFP1 writes the analysis result of "<Name> TOSABA, <Number> 0445205824" in the designated area in the non-volatile memory 86 (ST15).

Thereafter, the CPU 91 of MFP1 describes "ACK mail" as follows (XML format) and sends it as a mail to the center machine 8 via the NIC 85 and Internet 7 (ST16):
    <PhoneBook1>
    <Name> TOSHIBA </Name>
    <Number> 0445205824 </Number>
    </PhoneBook1>
    or
    <PhoneBook1>
    OK
    </PhoneBook1>

The CPU 200 of center machine 8 temporarily stores the mail received from the Internet 7 via the communication I/F 203 in the RAM 202. The CPU 200 analyzes the mail using analysis software prestored in the ROM 201 and obtains an analysis result to the effect that the data write was successfully executed (OK) (ST17).

Figure 7:
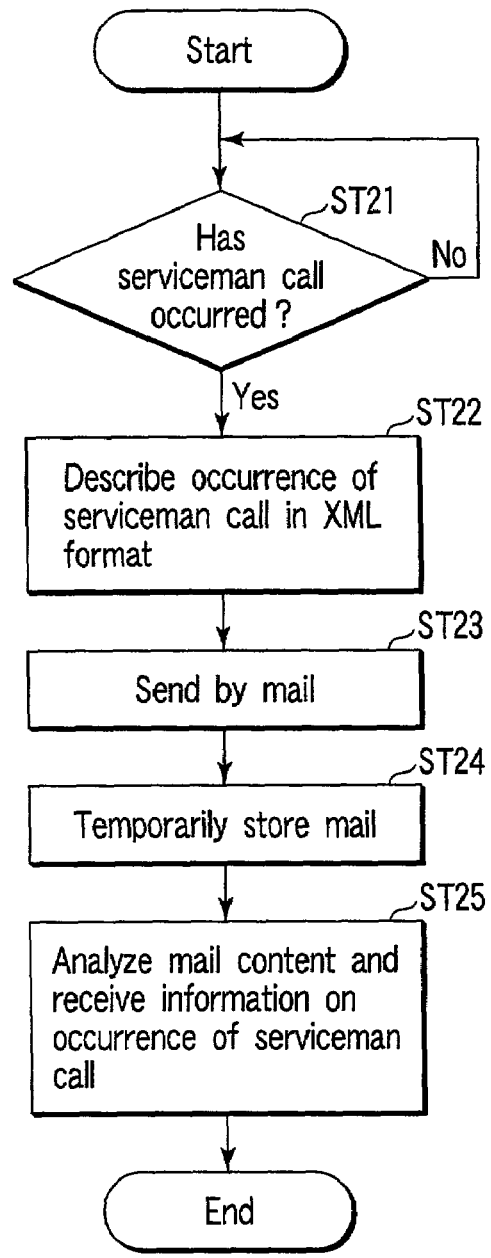
FIG. 7 is a flow chart illustrating an operation in a case where a serviceman call has occurred.

The operation of the system shown in FIG. 1 in the case where a serviceman call has occurred in the MFP1 will now be described with reference to a flow chart of FIG. 7.

When a serviceman call has occurred (ST21), the main CPU 91 of MFP1 describes it in XML format as follows (ST22):
    <Alert>
    Service Call#1
    </Alert>

The main CPU 91 of MFP1 sends it as mail content to the center machine 8 via the NIC 85 and Internet 7 (ST23).

The CPU 200 of center machine 8 temporarily stores the mail received from the Internet 7 via the communication I/F 203 in the RAM 202 (ST24). The CPU 200 analyzes the mail using analysis software prestored in the ROM 201 and obtains an analysis result to the effect that the serviceman call has occurred (ST25).

As has been described above, according to the embodiment of the invention, data transfer is effected using a mail via a network with a nearly zero cost, compared to the prior art wherein data transfer is effected using a telephone line with a low communication speed and a high cost. Moreover, in this embodiment, the communication speed is remarkably increased, that is, on the order of several-ten MBPS.

In the prior-art method in which the center has a main right of control, there are many problems with notices from the target machine. In this invention, since a mail is used, notices can easily be issued from the target machine.

Furthermore, as regards the network, in most cases, an Intranet in a company is provided with a firewall which substantially prohibits incoming data. In this invention, since a mail is used, it can easily pass through the firewall, and data read/write can be effected for the target machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transfer method for executing data read/write between a center machine and a target machine which are connected via a communication line,
    the center machine
    preparing an e-mail in a predetermined XML format for read-out of data stored in the target machine, and
    sending the prepared e-mail of the predetermined XML format to the target machine via the communication line,
    the target machine
    storing the e-mail of the predetermined XML format received via the communication line,
    analyzing the stored e-mail of the predetermined XML format using analysis software stored in advance in the target machine,
    reading out the data of a designated area in a non-volatile memory stored in the target machine on the basis of the analysis result,
    preparing an e-mail of a predetermined XML format, which contains the read-out data, and
    sending the prepared e-mail of the predetermined XML format to the center machine via the communication line, and
    the center machine
    storing the e-mail of the predetermined XML format received from the target machine via the communication line, and obtaining data by analyzing the stored e-mail of the predetermined XML format using analysis software stored in advance in the center machine.

2. A data transfer method according to claim 1, wherein said center machine is a personal computer.

3. A data transfer method according to claim 1, wherein said communication line is the Internet.

4. A data transfer method according to claim 1, wherein said center machine and said target machine are provided with firewalls at connection stages with the Internet.

5. A data transfer method according to claim 1, wherein the e-mail prepared by the center machine is prepared in a predetermined XML format as "read-out of telephone book" for read-out of data stored in the target machine.

6. A data transfer method for executing data read/write between a center machine and a target machine which are connected via a communication line,
    the center machine
    preparing an e-mail in a predetermined XML format which contains data to be written in the target machine, and
    sending the prepared e-mail of the predetermined XML format to the target machine via the communication line,
    the target machine
    storing the e-mail of the predetermined XML format received via the communication line, analyzing the stored e-mail of the predetermined XML format using analysis software stored in advance in the target machine, writing data in a designated area in a non-volatile memory stored in the target machine based on a result of the analysis, preparing an ACK e-mail in a predetermined XML format when writing of the data has been completed, and sending the prepared ACK e-mail of the predetermined XML format to the center machine via the communication line, and the center machine storing the ACK e-mail of the predetermined XML format received from the target machine via the communication line, and confirming that data has normally been written by analyzing the stored e-mail of the predetermined XML format using analysis software stored in advance in the center machine.

7. A data transfer method according to claim 6, wherein the e-mail prepared by the center machine is prepared in a predetermined XML format which contains data to be written in the target machine as "write of telephone book," and wherein the data written in the designated area in the non-volatile memory stored in the target machine is written in the designated area as "write of designated area in telephone book."

8. A data transfer method for executing data read/write between a center machine and an image forming apparatus which are connected to the Internet, the center machine preparing an e-mail in a predetermined XML format for read-out of data stored in the image forming apparatus, and sending the prepared e-mail of the predetermined XML format to the image forming apparatus via the Internet, the image forming apparatus storing the e-mail of the predetermined XML format received via the Internet, analyzing the stored e-mail of the predetermined XML format using analysis software stored in advance in the image forming apparatus, reading out the data of a designated area in a non-volatile memory stored in the image forming apparatus on the basis of the analysis result, preparing an e-mail of a predetermined XML format, which contains the read-out data, and sending the prepared e-mail of the predetermined XML format to the center machine via the Internet, and the center machine storing the e-mail of the predetermined XML format received from the image forming apparatus via the Internet, and obtaining data by analyzing the stored e-mail of the predetermined XML format using analysis software stored in advance in the center machine.

9. A data transfer method according to claim 8, wherein the e-mail prepared by the center machine is prepared in a predetermined XML format as "read-out of telephone book" for read-out of data stored in the target machine.

10. A data transfer method for executing data read/write between a center machine and an image forming apparatus which are connected to the Internet, the center machine preparing an e-mail in a predetermined XML format which contains data to be written in the image forming apparatus, and sending the prepared e-mail of the predetermined XML format to the image forming apparatus via the Internet, the image forming apparatus storing the e-mail of the predetermined XML format received via the Internet, analyzing the stored e-mail of the predetermined XML format using analysis software stored in advance in the image forming apparatus, writing data in a designated area in a non-volatile memory stored in the image forming apparatus based on a result of the analysis, preparing an ACK e-mail in a predetermined XML format when writing of the data has been completed, and sending the prepared ACK e-mail of the predetermined XML format to the center machine via the Internet, and the center machine storing the ACK e-mail of the predetermined XML format received from the image forming apparatus via the Internet, and confirming that data has normally been written by analyzing the stored e-mail of the predetermined XML format using analysis software stored in advance in the center machine.

11. A data transfer method according to claim 10, wherein the e-mail prepared by the center machine is prepared in a predetermined XML format which contains data to be written in the target machine as "write of telephone book," and wherein the data written in the designated area in the non-volatile memory stored in the target machine is written in the designated area as "write of designated area in telephone book."

\* \* \* \* \*